US012151663B2

(12) United States Patent
Yamamoto (10) Patent No.: US 12,151,663 B2
(45) Date of Patent: Nov. 26, 2024

(54) BRAKING CONTROL DEVICE (71) Applicant: ADVICS CO., LTD., Kariya (JP)

(72) Inventor: Yusaku Yamamoto, Kariya (JP)

(73) Assignee: ADVICS CO., LTD., Kariya (JP)

(*) Notice: Subject to any disclaimer, the term of this patent is extended or adjusted under 35 U.S.C. 154(b) by 223 days.

(21) Appl. No.: 17/792,855

(22) PCT Filed: Jan. 14, 2021

(86) PCT No.: PCT/JP2021/001106
§ 371 (c)(1),
(2) Date: Jul. 14, 2022

(87) PCT Pub. No.: WO2021/145391
PCT Pub. Date: Jul. 22, 2021

(65) Prior Publication Data
US 2023/0025963 A1 Jan. 26, 2023

(30) Foreign Application Priority Data
Jan. 17, 2020 (JP) .................. 2020-005846

(51) Int. Cl.
*B60T 8/1755* (2006.01)
*B60L 7/24* (2006.01)
(52) U.S. Cl.
CPC ............. *B60T 8/1755* (2013.01); *B60L 7/24* (2013.01); *B60T 2220/03* (2013.01);
(Continued)
(58) Field of Classification Search
CPC ...................................................... B60T 8/1755
See application file for complete search history.

(56) References Cited

U.S. PATENT DOCUMENTS 6,422,663 B1 * 7/2002 Siepker ..................... B60T 8/26
188/DIG. 1
2005/0159871 A1 * 7/2005 Nakamura ............... B60K 6/52
303/121

(Continued)

FOREIGN PATENT DOCUMENTS

JP 2013180670 A 9/2013
JP 2015201913 A 11/2015
JP 2018207654 A 12/2018

OTHER PUBLICATIONS

International Search Report (PCT/ISA/210) with translation and Written Opinion (PCT/ISA/237) mailed on Mar. 9, 2021, by the Japan Patent Office as the International Searching Authority for International Application No. PCT/JP2021/001106. (11 pages).

*Primary Examiner* — George C Jin
(74) *Attorney, Agent, or Firm* — BUCHANAN, INGERSOLL & ROONEY PC (57) ABSTRACT A control device includes: a first braking unit, that applies a first braking force to a steering wheel of a vehicle; a second braking unit, that applies a second braking force to a non-steering wheel of the vehicle; and a control device that controls the first braking unit, and the second braking unit, according to a target braking force, where the control device includes a steering angle information acquiring unit that acquires a steering angle-related value related to a steering angle of the steering wheel, and a distribution changing unit that executes a distribution change control of changing a braking force distribution between the first braking force and the second braking force based on the steering angle-related value when the target braking force is applied.

12 Claims, 4 Drawing Sheets

(52) U.S. Cl.
CPC ..... *B60T 2250/03* (2013.01); *B60T 2270/304* (2013.01); *B60T 2270/604* (2013.01)

(56) References Cited

U.S. PATENT DOCUMENTS

| | | | |
|---|---|---|---|
| 2014/0365097 A1* | 12/2014 | Kujubu | B60T 8/1755 701/72 |
| 2016/0280191 A1* | 9/2016 | Okano | B60T 8/17 |
| 2017/0021731 A1* | 1/2017 | Suzuki | B60T 8/1755 |
| 2018/0141528 A1* | 5/2018 | Oh | B60W 30/18127 |
| 2020/0189398 A1 | 6/2020 | Suzuki et al. | |
| 2020/0324748 A1* | 10/2020 | Hiraga | B60T 7/22 |
| 2022/0144338 A1* | 5/2022 | Scheuerell | B60T 8/1755 |

* cited by examiner

BRAKING CONTROL DEVICE

TECHNICAL FIELD

The present disclosure relates to a braking control device.

BACKGROUND ART

Conventionally, a braking control device that controls a vehicle posture at the time of braking has been developed. For example, in a braking control device described in JP 2013-180670 A, a ratio of the braking forces of front and rear wheels and a ratio of the regenerative braking force and the friction braking force are determined based on driving operation information such as a brake operation amount and a steering wheel operation amount.

CITATIONS LIST

Patent Literature

Patent Literature 1: JP 2013-180670 A

SUMMARY

Technical Problems

However, in the braking control device, regarding the posture control at the time of turning of the vehicle, it is only described that whether or not to prioritize the posture control is determined according to the magnitude of the steering wheel operation amount, and the ratio between the regenerative braking force and the friction braking force for the same wheel is changed. That is, in the braking control device, there is room for improvement from the viewpoint of improving the stability (straight advancing stability) of the vehicle posture and the turning responsiveness at the time of turning of the vehicle in which the braking force is generated.

An object of the present disclosure is to provide a braking control device capable of improving straight advancing stability or turning responsiveness in a state where the braking force is being generated and a value related to a steering angle of a steering wheel is being detected.

Solutions to Problems

A braking control device of the present disclosure includes: a first braking unit that applies a first braking force to a steering wheel of a vehicle; a second braking unit that applies a second braking force to a non-steering wheel of the vehicle; and a control device that controls the first braking unit and the second braking unit according to a target braking force, where the control device includes a steering angle information acquiring unit that acquires a steering angle-related value related to a steering angle of the steering wheel, and a distribution changing unit that executes a distribution change control of changing a braking force distribution between the first braking force and the second braking force based on the steering angle-related value when the target braking force is applied.

Advantageous Effects of Disclosure

According to the present disclosure, the braking force distribution between the steering wheel and the non-steering wheel is changed based on the steering angle-related value related to the steering angle of the steering wheel (i.e., turning of the vehicle). The ease of turning can be changed by changing the braking force distribution. According to the steering angle-related value, straight advancing stability is improved by making the turning difficult, and conversely, turning responsiveness is improved by making the turning easy. That is, according to the present disclosure, the straight advancing stability or turning responsiveness can be improved in a state where the braking force is being generated and a value related to a steering angle is being detected.

DESCRIPTION OF EMBODIMENT

Figure 1:
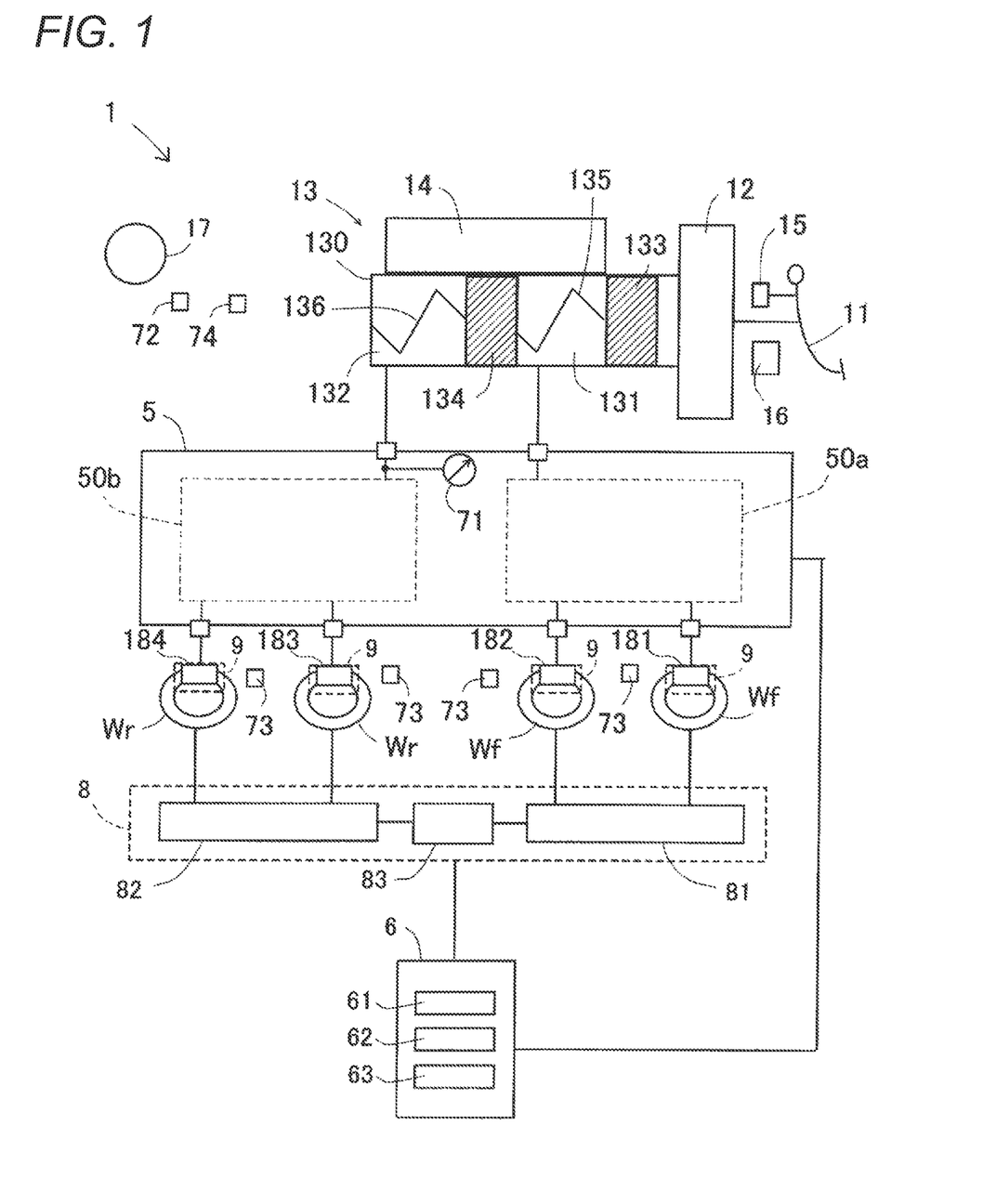
FIG. 1 is a configuration view of a braking control device according to the present embodiment.

Hereinafter, an embodiment of the braking control device disclosed here will be described based on the drawings. Each drawing used for description is a conceptual diagram. As shown in FIG. 1, a braking control device 1 of the present embodiment includes a brake pedal 11, a booster 12, a master cylinder unit 13, a reservoir 14, a brake switch 15, a stroke sensor 16, an actuator 5, a steering angle sensor 72, a yaw rate sensor 74, a brake ECU (corresponds to "control device") 6, and a regenerative braking device 8.

The brake pedal 11 is an operation member that allows the driver to operate the brake. The brake switch 15 is a sensor that detects whether or not the brake pedal 11 is operated. The stroke sensor 16 is a sensor that detects the pedal stroke (hereinafter referred to as "stroke") of the brake pedal 11. The brake switch 15 and the stroke sensor 16 output the detection signal to the brake ECU 6.

The booster 12 is a device that assists brake operation, and is, for example, a hydro-booster equipped with an accumulator, an electromagnetic valve, and the like. In this case, the brake pedal 11 is provided with a stroke simulator (not illustrated) that generates a reaction force with respect to the brake operation. The booster 12 uses an accumulator to generate a servo pressure corresponding to a stroke at the rear side of the master piston 133 described later. The master piston 133 moves forward by being pressed by the servo pressure. This configuration has a by-wire configuration in which the brake pedal 11 and the master cylinder unit 13 cooperatively move by control. The booster 12 is activated, for example, when a large braking force is required.

The master cylinder unit 13 is a device that generates a master pressure corresponding to the operation of the brake pedal 11. Specifically, the master cylinder 130 is a cylinder member and includes a first master chamber 131 and a second master chamber 132 in which a master pressure is generated. The master cylinder unit 13 is configured so that the same hydraulic pressure is formed in the first master chamber 131 and the second master chamber 132.

The first master chamber 131 is formed between the first master piston 133 and the second master piston 134. The second master chamber 132 is formed between the second master piston 134 and the bottom portion of the master cylinder 130. A first spring 135 is interposed between the first master piston 133 and the second master piston 134. A second spring 136 is interposed between the second master piston 134 and the bottom portion of the master cylinder 130. The reservoir 14 stores the brake fluid and resupplies the brake fluid to the master cylinder 130 (master chambers 131, 132). Communication between the reservoir 14 and the master chambers 131 and 132 is blocked when the master pistons 133 and 134 move forward by a predetermined amount.

The actuator 5 is a device that adjusts the hydraulic pressure (hereinafter referred to as "wheel pressure") of each wheel cylinder 181 to 184 based on the master pressure supplied from the master cylinder 130. The actuator 5 is disposed between the master cylinder 130 and the wheel cylinder 181 to 184. The actuator 5 adjusts the wheel pressure in accordance with an instruction from the brake ECU 6. A friction braking device (e.g., a disc brake device or a drum brake device) 9 provided on each of the wheels Wf and Wr is driven according to the wheel pressure, and a friction braking force is applied to each of the wheels Wf and Wr.

In response to an instruction from the brake ECU 6, the actuator 5 executes pressure increasing control for setting the wheel pressure to the same level as the master pressure, pressurization control for setting the wheel pressure to be higher than the master pressure, pressure reducing control for reducing the wheel pressure, or holding control for holding the wheel pressure. The actuator 5 executes, for example, anti-skid control (or also referred to as ABS control), sideslip prevention control (ESC control), automatic pressurization control, or the like based on the instruction from the brake ECU 6. The automatic pressurization control is pressurization control performed according to a set target deceleration regardless of the presence or absence of a brake operation by the driver, for example, in automatic driving, adaptive cruise control, or the like.

The actuator 5 includes a first piping system (corresponding to a "first braking unit") 50a connected to the first master chamber 131 and a second piping system (corresponding to a "second braking unit") 50b connected to the second master chamber 132. The first piping system 50a includes an electric pump, an electromagnetic valve, and the like (not illustrated), and is connected to the wheel cylinders 181 and 182 of the front wheel Wf. The second piping system 50b includes an electric pump, an electromagnetic valve, and the like (not illustrated), and is connected to the wheel cylinders 183 and 184 of the rear wheel Wr.

The actuator 5 can independently adjust the wheel pressure with respect to the front and rear wheels. That is, the actuator 5 can independently control the front wheel braking force and the rear wheel braking force. The actuator 5 is provided with a pressure sensor 71 that detects a master pressure. In the vehicle, a wheel speed sensor 73 is installed for each of the wheels Wf, Wr.

The steering angle sensor 72 is a sensor that detects a steering angle that is a turning angle of a steering wheel 17. The detection result of the steering angle sensor 72 is used for the steering angle control of the wheel, and is also transmitted to the brake ECU 6. The yaw rate sensor 74 is a sensor that detects a yaw rate of the vehicle. The detection result of the yaw rate sensor 74 is transmitted to the brake ECU 6.

(Brake ECU)

The brake ECU 6 is an electronic control unit including a CPU, a memory, and the like. Specifically, the brake ECU 6 is configured to execute various types of control by one or a plurality of processors. The brake switch 15, the stroke sensor 16, and each of the sensors 71 to 74, and the like are connected to the brake ECU 6 by a communication line (not shown). The brake ECU 6 determines whether or not the booster 12 and the actuator 5 need to be activated based on the detection results of these various sensors.

When determining that the actuator 5 needs to be activated, the brake ECU 6 calculates a target wheel pressure, which is a target value of the wheel pressure, for each wheel cylinder 181 to 184, and controls the actuator 5. The target wheel pressure corresponds to the target deceleration and the target braking force. The brake ECU 6 can calculate each wheel pressure based on the detection value of the pressure sensor 71 and the control situation of the actuator 5.

(Regenerative Braking Device)

The regenerative braking device 8 is a device that applies regenerative braking force to the wheel. A first motor (corresponding to a "first braking unit") 81 provided on the front wheel Wf of the present embodiment, a second motor (corresponding to a "second braking unit") 82 provided on the rear wheel Wr, an ECU 83, and an inverter and a battery (not illustrated) are provided. The first motor 81 applies regenerative braking force to the front wheel Wf. The second motor 82 applies regenerative braking force to the rear wheel Wr. The ECU 83 controls driving force and regenerative braking force of the first motor 81 and the second motor 82.

The brake ECU 6 calculates the target braking force based on the stroke of the brake pedal 11 or the instruction value in the automatic braking control. The brake ECU 6 instructs the target regenerative braking force to the ECU 83 based on the target braking force. The ECU 83 is communicably connected to the brake ECU 6, and controls the first motor 81 and the second motor 82 so as to apply the target regenerative braking force to the wheels. For example, when the target braking force is not achieved even by the regenerative braking force, the brake ECU 6 sets the target wheel pressure and generates the friction braking force by the actuator 5 and the friction braking device 9. In addition, the brake ECU 6 generates friction braking force under a predetermined condition.

As described above, the braking control device 1 of the present embodiment includes the first braking unit (the first piping system 50a and the first motor 81) that applies the front wheel braking force (corresponding to "first braking force") to the front wheel Wf, which is a steering wheel, the second braking unit (the second piping system 50b and the second motor 82) that applies the rear wheel braking force (corresponding to "second braking force") to the rear wheel Wr, which is a non-steering wheel, and the brake ECU 6 that controls the actuator 5 and the regenerative braking device 8 according to the target braking force. The first braking unit and the second braking unit are configured to be able to apply regenerative braking force and friction braking force to the wheels.

(Distribution Change Control)

The brake ECU 6 includes a steering angle information acquiring unit 61, a determination unit 62, and a distribution changing unit 63. The steering angle information acquiring unit 61 acquires a steering angle-related value related to the steering angle of the steering wheel. More specifically, the steering angle information acquiring unit 61 acquires the steering angle information from the steering angle sensor 72, and calculates at least one of the steering angle, the steering angular velocity, and the steering angular acceleration. The steering angle information acquiring unit 61 of the present embodiment calculates and acquires the steering angle, the steering angular velocity, and the steering angular acceleration as steering angle-related values by differential calculation or the like. The steering angle corresponds to a target steering angle during automatic driving. That is, the steering angle is not limited to the steering operation amount by the driver, and may be a control target value. The steering angle-related value may be a value related to the steering angle target value of the steering wheel.

The determination unit 62 determines whether or not to improve the straight advancing stability of the vehicle based on the steering angle-related value. The determination unit 62 determines whether or not to improve the turning responsiveness of the vehicle based on the steering angle-related value. The improvement in the straight advancing stability of the vehicle means that the vehicle is less likely to turn with respect to a change in the steering angle (or with respect to the steering angle of the steering wheels), that is, the vehicle is less likely to jolt. The improvement in the turning responsiveness of the vehicle means that the vehicle is likely to turn with respect to a change in the steering angle (or with respect to the steering angle of the steering wheels).

For example, in a case where the steering angular velocity is less than a predetermined velocity threshold value in a state where the steering angular velocity starts to increase from the steering angle 0, the determination unit 62 determines to improve the straight advancing stability of the vehicle, for example, when desiring to reduce the responsiveness with respect to steering at the initial stage of steering. The determination condition of the determination unit 62 regarding the straight advancing stability can be arbitrarily set, and other examples will be described later.

In addition, for example, in a case where the steering angle is greater than or equal to a predetermined angle threshold value and the steering angular velocity is greater than or equal to a velocity threshold value, the determination unit 62 determines that the driver has an intention of turning the vehicle and determines to improve the turning responsiveness of the vehicle. The determination unit 62 of the present embodiment further uses the detection result of the yaw rate sensor 74 (hereinafter referred to as "actual yaw rate") in order to increase the determination accuracy.

The brake ECU 6 (or another ECU in the vehicle) calculates a target yaw rate which is a control target based on the detection result of the steering angle sensor 72. The determination unit 62 calculates a difference between the target yaw rate and the actual yaw rate (hereinafter referred to as "yaw rate deviation"). The determination unit 62 determines to improve the turning responsiveness of the vehicle when the yaw rate deviation is greater than or equal to a predetermined threshold value in addition to the determination condition (steering angle≥angle threshold value and steering angular velocity≥velocity threshold value).

The distribution changing unit 63 executes the distribution change control of changing the braking force distribution between the front wheel braking force and the rear wheel braking force when applying the target braking force based on the steering angle-related value. More specifically, in a case where the determination unit 62 determines to improve the straight advancing stability of the vehicle in a state where only the regenerative braking force is applied to the front wheel Wf and the rear wheel Wr, the distribution changing unit 63 executes the straight advancing stability control of reducing the regenerative braking force of the rear wheel Wr and increasing the regenerative braking force of the front wheel Wf as the distribution change control. The distribution rate of the front wheel braking force (regenerative braking force) with respect to the total braking force (regenerative braking force) is increased by the straight advancing stability control.

In addition, in a case where the determination unit 62 determines to improve the turning responsiveness of the vehicle in a state where only the regenerative braking force is applied to the front wheel Wf and the rear wheel Wr, the distribution changing unit 63 executes the turning improvement control of reducing the regenerative braking force of the front wheel Wf and increasing the regenerative braking force of the rear wheel Wr as the distribution change control. The distribution rate of the front wheel braking force (regenerative braking force) with respect to the total braking force (regenerative braking force) is reduced by the turning improvement control.

Effects of the Present Embodiment

According to the present embodiment, the braking force distribution of the front and rear wheels is changed based on the steering angle-related value related to the steering angle of the steering wheels (that is, turning of the vehicle). The ease of turning can be changed by changing the braking force distribution of the front and rear wheels. According to the steering angle-related value, straight advancing stability is improved by making the turning difficult, and conversely, turning responsiveness is improved by making the turning easy. That is, according to the present embodiment, the straight advancing stability or turning responsiveness can be improved in a state where the braking force is being generated and a value related to a steering angle is being detected.

More specifically, according to the present embodiment, in a case where the straight advancing stability is improved by suppressing the turning while only the regenerative braking force is generated on the front and rear wheels, the distribution rate of the regenerative braking force of the front wheel Wf, which is the braking force of the steering wheel, is increased by executing the straight advancing stability control. As a result, in a friction circle of the front wheel Wf, the front-rear increases, and the reserve force (grip force) of the lateral force reduces. Therefore, it becomes difficult to turn, and straight advancing stability is improves.

Furthermore, according to the present embodiment, in a case where the turning responsiveness is improved while only the regenerative braking force is generated on the front and rear wheels, the distribution rate of the regenerative braking force of the front wheel Wf can be reduced. As a result, in a friction circle of the front wheel Wf, the front-rear reduces, and the reserve force (grip force) of the lateral force increases. Therefore, it becomes easy to turn, and turning responsiveness improves. The straight advancing stability can also be said to be comfort of the occupant. Furthermore, the turning responsiveness can also be said to be following property of turning with respect to the steering angle of the front wheel Wf.

First Control Example

A first control example will be described with reference to FIG. 2. In the first control example, a state in which the driver is not operating neither the accelerator pedal nor the brake pedal 11 while the vehicle is turning, and only the regenerative braking force is applied to all the wheels in a normal case (when the distribution change control is not executed) is assumed. The target braking force (e.g., a structurally determined value) set in a state where the accelerator pedal is not operated and the brake pedal 11 is not operated is applied to the wheel only with the regenerative braking force. At this time, the distribution rate of the front wheel braking force is usually 50%. In the first control example, for example, high-speed traveling is assumed. In addition, the situation of the first control example is a situation in which the brake operation is not performed and the target braking force is applied to the wheel only by the regenerative braking force.

When the steering angle starts to increase at time Ta1, the determination unit 62 determines to improve the straight advancing stability of the vehicle since the steering angular velocity is less than the velocity threshold value (steering angle increases from 0 and steering angular velocity<velocity threshold value). That is, at time Ta1, the distribution changing unit 63 executes the straight advancing stability control as the distribution change control. As a result, the front wheel braking force (regenerative braking force) increases at a predetermined gradient, and the rear wheel braking force (regenerative braking force) reduces at a predetermined gradient. In this example, the distribution rate of the front wheel braking force becomes 100% by the straight advancing stability control.

At time Ta2, since the steering angular velocity is in an increasing tendency (changes due to an increase gradient) and is greater than or equal to the velocity threshold value, the determination unit 62 determines to improve the turning responsiveness of the vehicle. That is, at time Ta2, the distribution changing unit 63 executes the turning improvement control as the distribution change control. As a result, the front wheel braking force (regenerative braking force) reduces at a predetermined gradient, and the rear wheel braking force (regenerative braking force) increases at a predetermined gradient. In this example, the distribution rate of the front wheel braking force becomes 0% by the turning improvement control. Note that the distribution rate in each control may be a numerical value other than the present example. In this manner, the distribution changing unit 63 changes the front-rear distribution of the regenerative braking force.

At time Ta3, since the steering angular velocity is in a reducing tendency (changes due to a reduction gradient) and is less than the velocity threshold value during the execution of the first turning improvement control, the determination unit 62 determines to improve the straight advancing stability of the vehicle. That is, at time Ta3, the distribution changing unit 63 executes the straight advancing stability control as the distribution change control. As a result, the front wheel braking force (regenerative braking force) increases at a predetermined gradient, and the rear wheel braking force (regenerative braking force) reduces at a predetermined gradient.

From time Ta3 to time Ta4, the steering angular velocity is maintained at less than the velocity threshold value, and the straight advancing stability control is maintained. At time Ta4, the steering angle starts to increase, and the steering angular velocity also increases, but the straight advancing stability control is maintained since the steering angular velocity is less than the velocity threshold value. As described above, in the present example, when the driver starts to steer the steering wheel 17, the straight advancing stability control is executed first, and then the first turning improvement control is executed. Then, after the steering angular velocity exceeds the peak, the turning improvement control is shifted to the straight advancing stability control.

Figure 2:
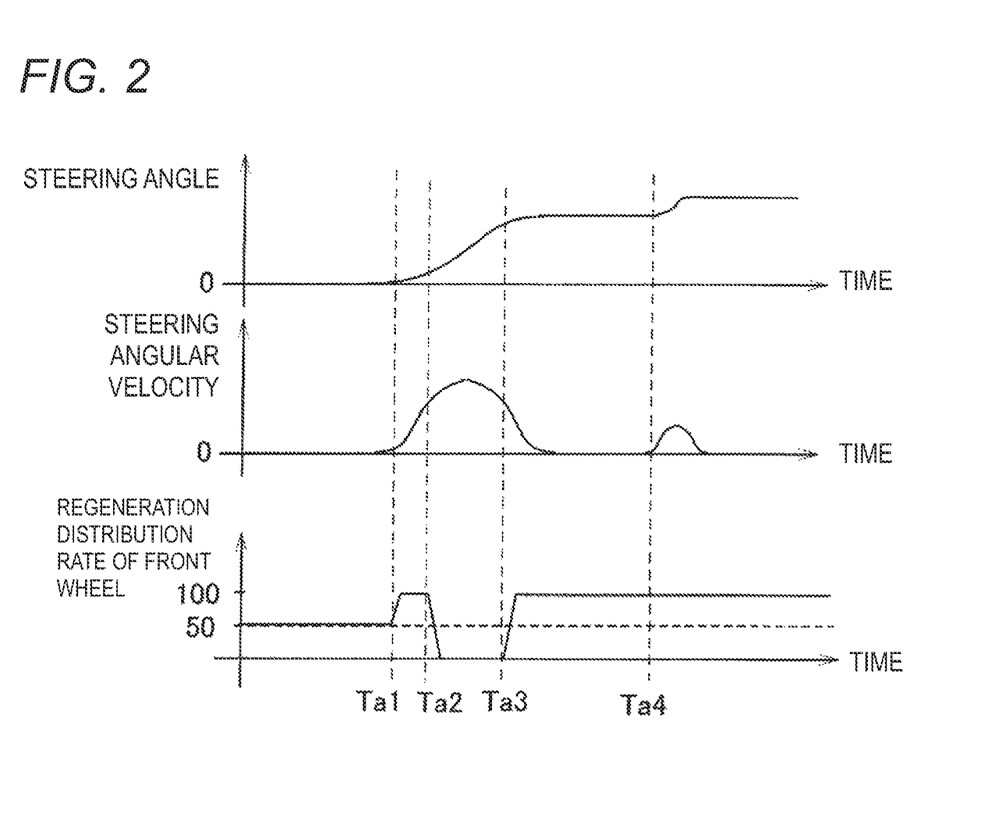
FIG. 2 is a time chart for describing a distribution change control of a first control example of the present embodiment.

Depending on the situation (e.g., vehicle speed, vehicle type etc.), the distribution of the regenerative braking force of the front wheel Wf (front wheel regeneration distribution rate) may be made opposite to that in FIG. 2 from time Ta1 to time Ta3. That is, the front wheel regeneration distribution rate may be reduced between time Ta1 and time Ta2, and the front wheel regeneration distribution rate may be increased between time Ta2 and time Ta3. As a result, the turning responsiveness is improved between time Ta1 and time Ta2, and the straight advancing stability is improved between time Ta2 and time Ta3. In this case, the front wheel regeneration distribution rate after time Ta3 is set to a predetermined value (0 to 100%).

Figure 3:
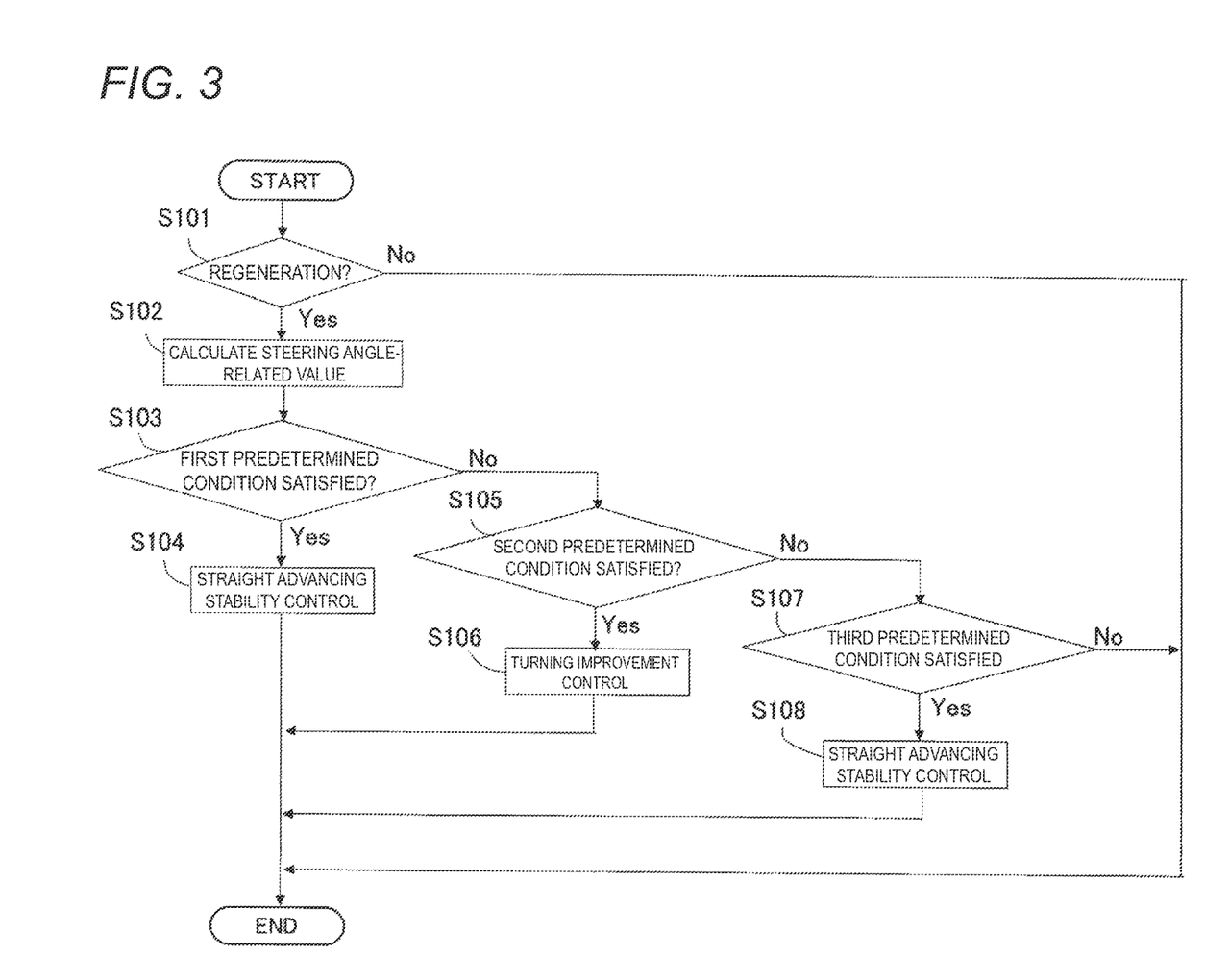
FIG. 3 is a flowchart for describing the distribution change control of the first control example of the present embodiment.

Here, a flow of the distribution change control will be described with reference to FIG. 3. In a state where the regenerative braking force is applied to the front and rear wheels (S101: Yes), the brake ECU 6 calculates the steering angle, the steering angular velocity, and the target yaw rate from the detection result of the steering angle sensor 72 (S102). Subsequently, the brake ECU 6 determines whether or not the present state is such that the steering angular velocity is in a reducing tendency and the steering angular velocity is less than the velocity threshold value during the execution of the turning improvement control (hereinafter referred to as "first predetermined condition") (S103). When the first predetermined condition is satisfied (S103: Yes), the brake ECU 6 executes the straight advancing stability control (S104). S104 corresponds to the state of time Ta3 in FIG. 2.

When the first predetermined condition is not satisfied (S103: No), the brake ECU 6 determines whether or not the steering angle is greater than or equal to the angle threshold value, the steering angular velocity is greater than or equal to the velocity threshold value, and the yaw rate deviation is greater than or equal to the threshold value (hereinafter referred to as "second predetermined condition") (S105). When the second predetermined condition is satisfied (S105: Yes), the brake ECU 6 executes the turning improvement control (S106). S106 corresponds to the state of time Ta2 in FIG. 2.

When the second predetermined condition is not satisfied (S105: No), the brake ECU 6 determines whether or not the steering angle is greater than 0 and the steering angular velocity is less than the velocity threshold value (hereinafter referred to as "third predetermined condition") (S107). When the third predetermined condition is satisfied (S107: Yes), the brake ECU 6 executes the straight advancing stability control (S108). S108 corresponds to the state of time Ta1 in FIG. 2. When the third predetermined condition is not satisfied (S107: No), the brake ECU 6 does not execute the distribution change control. The brake ECU 6 executes the above process every time the steering angle information is acquired (at predetermined intervals).

Effect of First Control Example

According to the first control example, effects similar to those of the present embodiment are demonstrated. In addition, at the beginning when the steering angle starts to increase from 0, the detection value may be that the steering wheel 17 jolted against the intention of the driver (e.g., an unintended operation by an elderly driver). Therefore, at the beginning of the increase in the steering angle, unnecessary turning can be suppressed, and the stability of the vehicle posture and the comfort of the occupant can be improved by improving the straight advancing stability of the vehicle. In the first control example, the execution condition is set such that the straight advancing stability control is executed at the beginning of the increase in the steering angle. Therefore, the above effect is demonstrated.

In addition, when the driver's intention to turn is clear and/or the turning degree of the vehicle is insufficient with respect to the target turning trajectory, it is preferable that the turning of the vehicle is facilitated by the turning improvement control. In the first control example, the turning improvement control can be executed at a preferable timing by using the execution condition that can determine that the driver has a clear operation intention and the yaw rate deviation. In the first control example, the execution condition is set to switch to the straight advancing stability control when the turning state is stabilized after the turning improvement control is executed. As a result, convergence of the vehicle to the target trajectory is improved. As described above, according to the first control example, the distribution change control can be executed at a preferable timing in the vehicle that generates the regenerative braking force in the front and rear wheels.

Furthermore, in the first control example, the braking force distribution of the front and rear wheels is changed only by the regenerative braking force. The regenerative braking force has higher responsiveness to control (command) than friction braking force using hydraulic pressure. That is, the braking force distribution can be quickly changed. The regenerative braking force also has relatively high adjustment accuracy of the braking force. Therefore, the action by the distribution change control such as during turning can be more effectively demonstrated. In addition, the change in the front-rear distribution is less likely to be transmitted to the occupant, and the comfort is easily maintained.

Second Control Example

Figure 4:
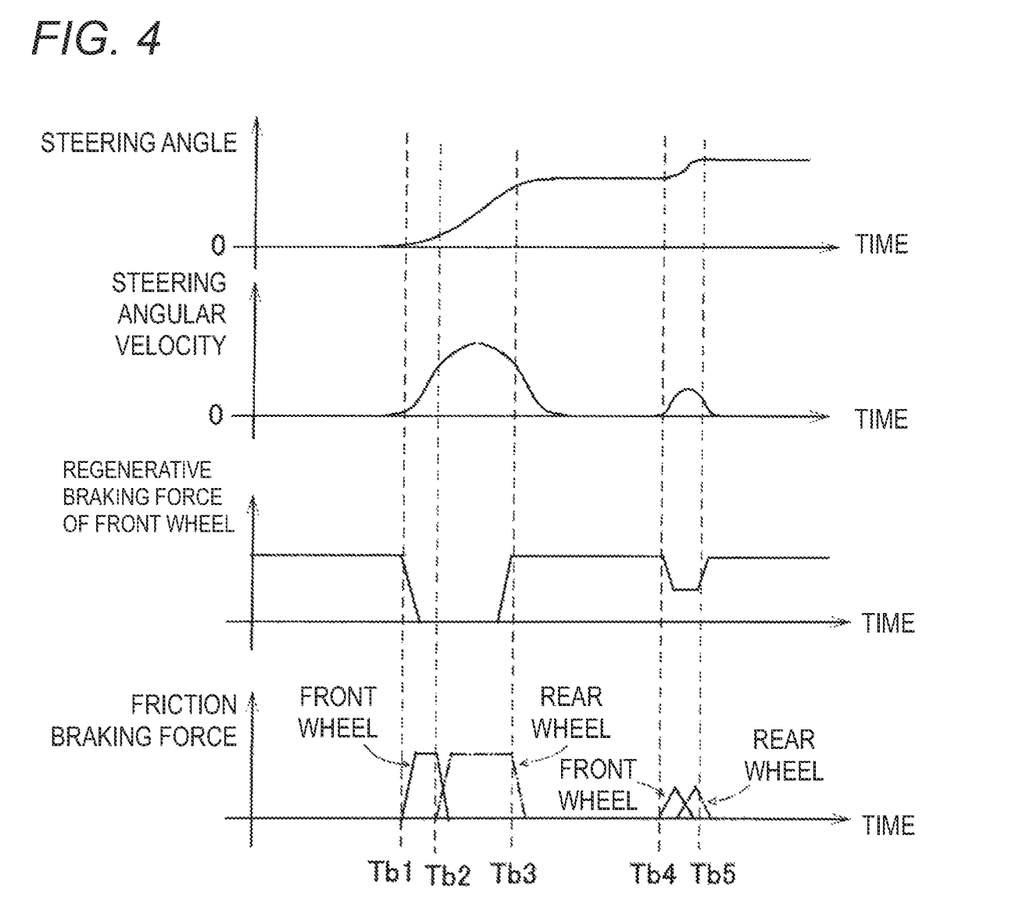
FIG. 4 is a time chart for describing a distribution change control of a second control example of the present embodiment.

A second control example will be described with reference to FIG. 4. In the second control example, a case where only the first motor 81 is provided in the vehicle, or a case where the motors 81 and 82 are provided in the vehicle but the regenerative braking force is generated only in the front wheel Wf are assumed. That is, in the second control example, a situation where the regenerative braking force is generated only in the front wheel Wf is assumed. The first braking units 50a, 81 are configured to be able to apply regenerative braking force to the wheel. In the second control example, similarly to the first control example, a state where the accelerator pedal is not operated and the brake pedal 11 is not operated is assumed. In the description of the second control example, the description of the first control example will be appropriately referred to. In addition, in the second control example, assuming that the vehicle travels at a low speed, it is set such that the turning improvement control is executed instead of the straight advancing stability control at the beginning of the increase in steering angle.

At time Tb1, the brake ECU 6 executes the turning improvement control according to the increase in the steering angle. The turning improvement control in the second control example is a control of switching at least a part of the regenerative braking force of the front wheel Wf to the friction braking force of the front wheel Wf. That is, when the determination unit 62 determines to improve the turning responsiveness of the vehicle in a state where the regenerative braking force that is the front wheel braking force is applied to the wheel, the distribution changing unit 63 executes the turning improvement control of increasing the friction braking force of the front wheel Wf and reducing the regenerative braking force of the front wheel Wf.

At time Tb2, the brake ECU 6 executes the straight advancing stability control in order to enhance convergence of the vehicle to the target route. The straight advancing stability control in the second control example is a control of witching the front wheel braking force (here, friction braking force) to the friction braking force of the rear wheel Wr. That is, when the determination unit 62 determines to improve the straight advancing stability of the vehicle in a state where the front wheel braking force is applied to the wheel, the distribution changing unit 63 executes the straight advancing stability control of increasing the friction braking force of the rear wheel Wr and reducing the front wheel braking force as the distribution change control. At the time of execution of the straight advancing stability control, the front wheel braking force may be a friction braking force or a regenerative braking force.

At time Tb3, the brake ECU 6 determines that the turning state is stable, stops the distribution change control, and returns to a state in which there is no control, that is, a state in which only the regenerative braking force of the front wheel Wf is generated. In Tb4 to Tb5, similar to the above, the straight advancing stability control is executed after the execution of the turning improvement control according to the increase in the steering angle. At this time, the switching of the braking force is performed partially instead of entirely (0 or 100%). The improvement degree in the straight advancing stability or the turning responsiveness can be changed by switching a part of the braking force between the front and rear wheels or between regeneration/friction. The switching may be performed with at least a part of the braking force.

Effect of Second Control Example

According to the turning improvement control of the second control example, the regenerative braking force and the friction braking force are switched in the front wheel Wf. As the ratio of the friction braking force of the front wheel braking force increases, the steering angle (tire turning angle) of the front wheel Wf slightly faces the vehicle inner side due to the influence of the compliance steer in terms of structure. The steering angle (tire turning angle) of the turning outer ring of the front wheel Wf has a relatively large influence on the turning of the vehicle from the manner of applying the ground load during the turning. Therefore, the turning responsiveness is improved by the turning outer ring facing the vehicle inner side, that is, the turning direction.

On the other hand, the friction braking force of the rear wheel Wr increases, and the steering angle (tire turning angle) of the rear wheel Wr slightly faces the vehicle inner side. As the steering angle (tire turning angle) of the rear wheel Wr faces the vehicle inner side, the vehicle is less likely to turn, and the straight advancing stability improves. That is, according to the straight advancing stability control of the second control example, the straight advancing stability of the vehicle is improved. Note that the straight advancing stability control of the second control example may be executed in S104 and S108 of FIG. 2, and the turning improvement control of the second control example may be executed in S106 of FIG. 2. In the case of the second control example, in S101, the brake ECU 6 may determine whether or not the regenerative braking force is applied to the front wheel Wf.

Third Control Example

When the vehicle is jolted sideways (hereinafter referred to as "roll") due to a side wind, a road surface condition, or the like without the intention of the driver, the brake ECU 6 executes straight advancing stability control. The brake ECU 6 determines the presence or absence of the roll based on the yaw rate deviation. For example, when the actual yaw rate is greater than the target yaw rate and the yaw rate deviation is greater than or equal to a predetermined threshold value, the brake ECU 6 determines that the roll has occurred. In this case, the determination unit 62 determines to improve the straight advancing stability of the vehicle. Note that the presence or absence of vibration of the steering angle-related value may be added as the determination element of the roll. In this case, for example, the brake ECU 6 determines that there is roll when the yaw rate deviation becomes greater than or equal to the predetermined threshold value after detecting the vibration.

For example, when the regenerative braking force is generated as the front wheel braking force, the distribution changing unit 63 reduces the regenerative braking force of the front wheel Wf and increases the friction braking force of the rear wheel Wr as the straight advancing stability control. As a result, the turning of the vehicle is suppressed against the roll, and the vehicle posture is stabilized.

The determination unit 62 determines to improve the straight advancing stability of the vehicle when vibration of the steering angle-related value is detected. For example, when the steering angle varies such that a predetermined number of peaks appear within a predetermined changing width within a predetermined time, the determination unit 62 determines that there is vibration. For example, when the driver is an elderly, the steering wheel 17 may jolt regardless of the driver's intention. In such a case, unnecessary turning is suppressed, and the vehicle posture is stabilized by executing the straight advancing stability control.

As described above, when improving the straight advancing stability of the vehicle during the turning of the vehicle, the brake ECU 6 executes the straight advancing stability control of increasing the regenerative braking force of the steering wheel by using the braking force of the steering wheel as the regenerative braking force, or increasing the friction braking force of the non-steering wheel by using the braking force of the non-steering wheel as the friction braking force. Furthermore, when improving the turning responsiveness of the vehicle during the turning of the vehicle, the brake ECU 6 executes the turning improvement control of increasing the friction braking force of the steering wheel by using the braking force of the steering wheel as the friction braking force, or increasing the regenerative braking force of the non-steering wheel by using the braking force of the non-steering wheel as the regenerative braking force.

In a case where the turning responsiveness of the vehicle during the turning of the vehicle is improved in a state where the regenerative braking force is applied to the steering wheel and the non-steering wheel, the distribution changing unit 63 executes the turning improvement control of reducing the regenerative braking force of the steering wheel and increasing the regenerative braking force of the non-steering wheel as the distribution change control.

In a case where the straight advancing stability of the vehicle during the turning of the vehicle is improved in a state where the braking force of the steering wheel is applied to the steering wheel, the distribution changing unit 63 executes the straight advancing stability control of increasing the friction braking force of the non-steering wheel and reducing the braking force of the steering wheel as the distribution change control.

In a case where the turning responsiveness of the vehicle during the turning of the vehicle is improved in a state where the regenerative braking force is applied to the steering wheel as the braking force of the steering wheel, the distribution changing unit 63 executes the turning improvement control of increasing the friction braking force as the braking force of the steering wheel and reducing the regenerative braking force of the steering wheel.

<Others>

The present disclosure is not limited to the embodiment and the control examples described above. For example, the determination condition by the determination unit 62 is not limited to the above. For example, the distribution changing unit 63 may be set to execute the straight advancing stability control when the steering angle, the steering angular velocity, and/or the steering angular acceleration (differential value of the steering angular velocity) is greater than or equal to a first predetermined value, and to execute the turning improvement control when the steering angle, the steering angular velocity, and/or the steering angular acceleration is greater than or equal to a second predetermined value (first predetermined value<second predetermined value). In addition, for example, the determination can be made faster by using the steering angular acceleration as a determination element. In addition, a predetermined angular range or a predetermined velocity range may be used as the determination threshold value.

The present disclosure is applicable not only to, for example, an electric vehicle and a hybrid vehicle, but also to a vehicle in which regenerative braking force is not generated (vehicle in which braking force is friction braking force). The present disclosure is also applicable to automatic driving vehicle. The steering angle-related value in the automatic driving may be a command value related to a steering angle (e.g., target yaw rate which is a control target value). That is, the steering angle is not limited to the result of the steering operation by the driver. The braking unit (actuator 5) may include an electric cylinder. In addition, the generation of the braking force is not limited only to the operation of the brake pedal 11, and may be performed by automatic brake control. The present disclosure can also be applied to a vehicle with one pedal. The distribution change control of the present disclosure can be executed in a state where deceleration is generated by some braking force. The present disclosure can also be applied when the vehicle is moving backward. In addition, the turning of the vehicle includes steering operation (vibration) not intended by the driver and turning due to side wind.

The steering wheel may be the rear wheel Wr. In this case as well, similar effects as described above are demonstrated. For example, when the turning responsiveness is improved in a state where the regenerative braking force is applied to the rear wheel Wr, the distribution changing unit 63 changes at least a part of the regenerative braking force of the steering wheel (rear wheel Wr) with the friction braking force. As a result, the steering angle of the rear wheel Wr is directed inward by the compliance steer, and the cornering force (lateral force) of the rear wheel Wr is reduced. Therefore, the cornering force of the rear wheel Wr is relatively small with respect to the cornering force of the front wheel Wf, and the difference between the cornering forces becomes large. That is, the vehicle easily turns. Regarding the change between the regenerative braking force and the friction braking force in such a steering wheel, the turning responsiveness is improved because the influence of the change in the steering angle of the turning outer ring is large when the front wheel Wf is the steering wheel, and the turning responsiveness is improved because the influence of the reduction in the cornering force of the rear wheel Wr is large when the rear wheel Wr is the steering wheel. In addition, regarding the straight advancing stability control and the turning improvement control, in a case where the rear wheel Wr is the steering wheel, similar effects are demonstrated by the same theory as in a case where the front wheel Wf is the steering wheel.

The invention claimed is:

1. A braking control device comprising:
   a first braking unit that applies a first braking force to a steering wheel of a vehicle;
   a second braking unit that applies a second braking force to a non-steering wheel of the vehicle; and
   a control device that controls the first braking unit and the second braking unit according to a target braking force, wherein
   the control device includes
   a steering angle information acquiring unit that acquires a steering angle-related value related to a steering angle of the steering wheel, and
   a distribution changing unit that executes a distribution change control of changing a braking force distribution between the first braking force and the second braking force based on the steering angle-related value when the target braking force is applied, wherein
   the first braking unit is configured to be able to apply at least one of regenerative braking force and friction braking force to the steering wheel, and
   the second braking unit is configured to be able to apply at least one of the regenerative braking force and the friction braking force to the non-steering wheel, and
   the control device,
   executes a straight advancing stability control of increasing the regenerative braking force of the steering wheel by using the first braking force as the regenerative braking force or increasing the friction braking force of the non-steering wheel by using the second braking force as the friction braking force when improving straight advancing stability of the vehicle during turning of the vehicle, and
   executes a turning improvement control of increasing the friction braking force of the steering wheel by using the first braking force as the friction braking force, or increasing the regenerative braking force of the non-steering wheel by using the second braking force as the regenerative braking force when improving turning responsiveness of the vehicle during turning of the vehicle.

2. The braking control device according to claim 1, wherein in a case where the straight advancing stability of the vehicle during the turning of the vehicle is improved in a state where the first braking force is applied to the steering wheel, the distribution changing unit executes the straight advancing stability control of increasing the friction braking force of the non-steering wheel and reducing the first braking force of the steering wheel as the distribution change control.

3. The braking control device according to claim 2, wherein
   the first braking unit is configured to be able to apply the regenerative braking force to the steering wheel and the non-steering wheel, and
   the distribution changing unit executes the turning improvement control of increasing the friction braking force of the steering wheel as the first braking force and reducing the regenerative braking force of the steering wheel when improving the turning responsiveness of the vehicle during turning of the vehicle in a state where the regenerative braking force is applied to the steering wheel as the first braking force.

4. The braking control device according to claim 1, wherein the control device executes the straight advancing stability control when vibration of the steering angle-related value is detected.

5. The braking control device according to claim 4, further comprising a yaw rate sensor that detects a yaw rate of the vehicle, wherein
   the distribution changing unit executes the distribution change control based on a difference between a target yaw rate, which is the steering angle-related value, and the yaw rate.

6. The braking control device according to claim 1, wherein
   the first braking unit is configured to be able to apply the regenerative braking force to the steering wheel,
   the second braking unit is configured to be able to apply the regenerative braking force to the non-steering wheel, and
   the distribution changing unit executes, as the distribution change control, the straight advancing stability control of reducing the regenerative braking force of the non-steering wheel and increasing the regenerative braking force of the steering wheel when improving the straight advancing stability of the vehicle during turning of the vehicle in a state where the regenerative braking force is applied to the steering wheel and the non-steering wheel.

7. The braking control device according to claim 6, wherein
   the distribution changing unit executes, as the distribution change control, the turning improvement control of reducing the regenerative braking force of the steering wheel and increasing the regenerative braking force of the non-steering wheel when improving the turning responsiveness of the vehicle during turning of the vehicle in a state where the regenerative braking force is applied to the steering wheel and the non-steering wheel.

8. The braking control device according to claim 1, wherein
   the first braking unit is configured to be able to apply the regenerative braking force to the steering wheel,
   the second braking unit is configured to be able to apply the regenerative braking force to the non-steering wheel, and
   the distribution changing unit executes, as the distribution change control, the turning improvement control of reducing the regenerative braking force of the steering wheel and increasing the regenerative braking force of the non-steering wheel when improving the turning responsiveness of the vehicle during turning of the vehicle in a state where the regenerative braking force is applied to the steering wheel and the non-steering wheel.

9. The braking control device according to claim 6, wherein in a case where the straight advancing stability of the vehicle during the turning of the vehicle is improved in a state where the first braking force is applied to the steering wheel, the distribution changing unit executes the straight advancing stability control of increasing the friction braking force of the non-steering wheel and reducing the first braking force of the steering wheel as the distribution change control.

10. The braking control device according to claim 9, wherein
- the first braking unit is configured to be able to apply the regenerative braking force to the steering wheel and the non-steering wheel, and
- the distribution changing unit executes the turning improvement control of increasing the friction braking force of the steering wheel as the first braking force and reducing the regenerative braking force of the steering wheel when improving the turning responsiveness of the vehicle during turning of the vehicle in a state where the regenerative braking force is applied to the steering wheel as the first braking force.

11. The braking control device according to claim 6, wherein the control device executes the straight advancing stability control when vibration of the steering angle-related value is detected.

12. The braking control device according to claim 11, further comprising a yaw rate sensor that detects a yaw rate of the vehicle, wherein
- the distribution changing unit executes the distribution change control based on a difference between a target yaw rate, which is the steering angle-related value, and the yaw rate.

* * * * *